C. H. DAWSON.
Wheel-Plow.

No. 23,159. Patented Mar. 8, 1859.

WITNESSES:

INVENTOR:
C. H. Dawson.

UNITED STATES PATENT OFFICE.

C. H. DAWSON, OF JACKSONVILLE, ILLINOIS.

IMPROVEMENT IN CULTIVATORS.

Specification forming part of Letters Patent No. 23,159, dated March 8, 1859.

*To all whom it may concern:*

Be it known that I, C. H. DAWSON, of Jacksonville, in the county of Morgan and State of Illinois, have invented a new and Improved Plow; and I do hereby declare that the following is a full, clear, and exact description of the same, reference being had to the annexed drawings, making a part of this specification, in which—

Figure 1:
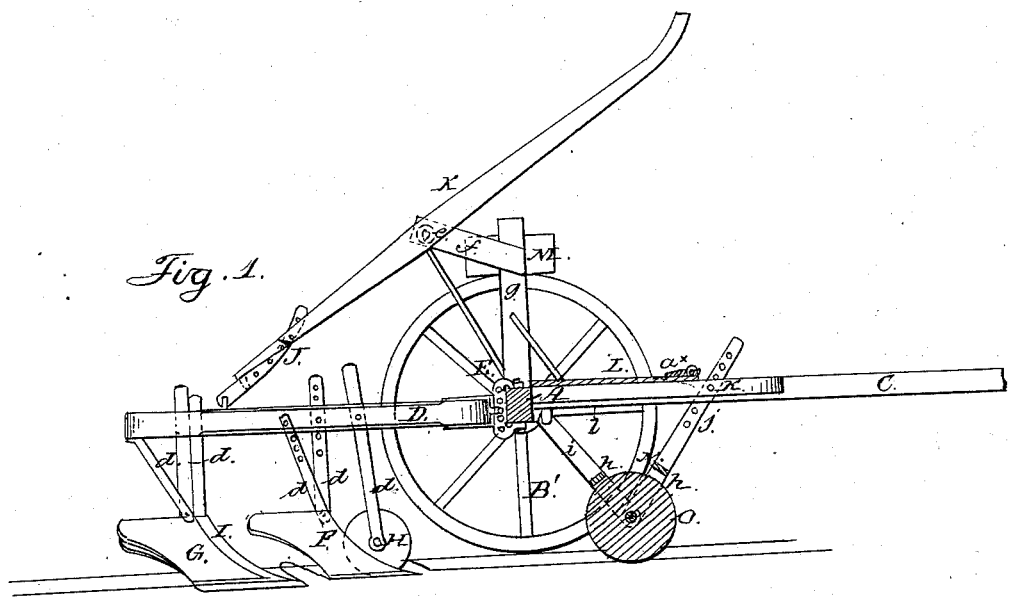
Figure 2:
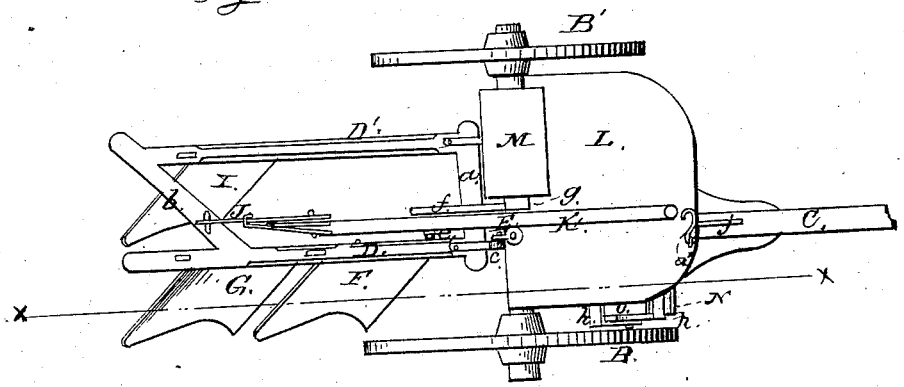

Figure 1 is a longitudinal vertical section of my invention, taken in the line $x\ x$, Fig. 2. Fig. 2 is a plan or top view of the same.

Similar letters of reference indicate corresponding parts in the two figures.

This invention consists in a peculiar arrangement of plow-beams in connection with a roller, as hereinafter fully shown and described.

To enable those skilled in the art to fully understand and construct my invention, I will proceed to describe it.

A represents an axle, and B B' are wheels attached thereto, one wheel, B, being larger than the other, B'.

C is a draft-pole attached to the axle A, and D D' are two plow-beams, the front ends of which are connected by a traverse-bar, $a$, which is at right angles with the beams, the back ends being connected by an oblique bar, $b$.

To the front end of each beam D D' a hook, $c$, is attached, and these hooks are fitted in either of a series of holes made in plates E, which are attached to the axle A, as shown clearly in Fig. 1. The hooks $c$ are allowed to work freely in the plates E E, and form hinge or joint connections, so that the beams may move up and down.

To the beam D, when the device is used as a subsoil-plow, two plows, F G, are attached, one being directly in front of the other, and a rotary colter, H, is placed by the landside of the front plow, F, as shown clearly in Fig. 1. The rotary colter and plows may be attached to the beam D by standards and braces D. The front plow, F, may be placed higher or lower by adjusting its standard and brace $d$. This plow turns the surface soil or sod, the colter of course performing the usual office of cutting the roots and facilitating the turning of the sod by the plow F. The plow G is set lower than plow F, so much so as to turn or act upon the subsoil below the bottom of the furrow made by share F.

When the device is used as a gang-plow the front plow, F, is detached and also the colter H, and a plow, I, is attached to the beam D'. The plow I, it will be seen by referring to Fig. 2, is by the side of plow G, and two furrows will be made at once as the implement is drawn along.

The two beams D D' are connected by a curved bar or link, J, to a lever, K, which has its fulcrum at $e$, said fulcrum being near the end of a bar, $f$, which is attached to a standard, $g$, on the axle A.

On the axle A and back part of the draft-pole C a platform, L, is placed, and the driver's seat M is placed on the platform just over the axle. The lever K extends over the seat M and within reach of the driver, so that the beams may be raised or elevated from the ground at any time, and the lever K may be secured in proper position by a hook, $a^\times$, or other suitable device to prevent the beams D D' from casually falling.

To the back part of the draft-pole C, or, rather, to the hounds attached thereto, there is secured an adjustable frame, N. This frame is formed of two parts, $h\ h$, to the lower ends of which are attached the axis of a roller, O, the roller being fitted loosely on said axis. The back part, $h$, of the frame N is connected by a bar, $i$, with the back part of the draft-pole, and the front part of the frame has a perforated bar, $j$, attached, which bar passes through the draft-pole, and may be secured at any desired point by a pin, $k$, the bar $i$ being connected with the draft-pole by a staple, $l$, which forms a joint connection. By this arrangement it will be seen that the roller O may be adjusted higher or lower. The roller extends the whole width of the machine, and crushes or breaks down the weeds, greatly facilitating the operation of the plows.

I would remark that the wheel B' is made of less diameter than B, in order to compensate for the difference in the height of the ground on which they run, the wheel B being in a furrow and the wheel B' on the unbroken land.

I do not claim broadly placing one plow by the side of another to form a gang-plow; nor do I claim placing one plow before another, both being secured to one beam and one adjusted lower than the other to form a subsoil-plow, for such devices have been previously used; but,

Having thus described my invention, what I do claim as new, and desire to secure by Letters Patent, is—

The plow-beams D D', arranged as shown, in connection with the roller O, applied to the machine, substantially as and for the purpose set forth.

C. H. DAWSON.

Witnesses:
A. E. A. MEACHAM,
F. S. RUNYON.